(12) United States Patent
Wallace (10) Patent No.: US 12,010,007 B1
(45) Date of Patent: Jun. 11, 2024

(54) DETECTING NOISY AGENTS IN NETWORK MONITORING

(71) Applicant: Amazon Technologies, Inc., Seattle, WA (US)

(72) Inventor: Ronan James Wallace, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/203,376

(22) Filed: Mar. 16, 2021

(51) Int. Cl.
| | |
|---|---|
| *G06F 15/16* | (2006.01) |
| *H04L 43/0852* | (2022.01) |
| *H04L 43/12* | (2022.01) |
| *H04L 43/16* | (2022.01) |

(52) U.S. Cl.
CPC .......... *H04L 43/16* (2013.01); *H04L 43/0852* (2013.01); *H04L 43/12* (2013.01)

(58) Field of Classification Search
CPC ...... H04L 43/16; H04L 43/0852; H04L 43/12
See application file for complete search history.

(56) References Cited

U.S. PATENT DOCUMENTS

| | | | | | |
|---|---|---|---|---|---|
| 6,671,254 | B1 * | 12/2003 | Nakahira | ........... | H04Q 11/0005 398/5 |
| 6,687,224 | B1 * | 2/2004 | Ater | .................... | H04L 41/5019 709/229 |
| 6,970,924 | B1 * | 11/2005 | Chu | .................... | H04L 41/5067 709/224 |
| 7,742,406 | B1 * | 6/2010 | Muppala | .................. | H04L 47/10 370/392 |
| 8,059,675 | B1 * | 11/2011 | Cook | .................. | H04L 43/0852 370/464 |
| 8,547,855 | B1 * | 10/2013 | Zingale | ................... | H04L 41/14 709/224 |
| 8,774,023 | B2 * | 7/2014 | Wang | .................... | H04L 41/082 370/252 |
| 8,935,006 | B2 * | 1/2015 | Vu | ......................... | G16H 70/40 901/1 |
| 10,834,265 | B1 * | 11/2020 | Antunes | .................. | H04L 65/80 |
| 11,323,312 | B1 * | 5/2022 | Banka | ..................... | H04L 43/10 |

(Continued)

FOREIGN PATENT DOCUMENTS

| | | | | | |
|---|---|---|---|---|---|
| WO | WO-2005004370 | A2 * | 1/2005 | ............... | H04L 1/20 |
| WO | WO-2005088578 | A1 * | 9/2005 | ............. | G01S 19/14 |

*Primary Examiner* — Moustafa M Meky
*Assistant Examiner* — Thorne E Waugh
(74) *Attorney, Agent, or Firm* — Klarquist Sparkman, LLP (57) ABSTRACT

Usually agents probe other agents across the network to determine the network health. If network data from noisy agents (i.e., agents themselves causing the high latency) is used, it degrades the overall probe statistics. Thus, agents can be identified as noisy and then data from such noisy agents can be excluded from further consideration, thereby improving the quality of the active monitoring dataset. An algorithm executing on a centralized server computer uses a sample of active monitoring probe data. A first part of the algorithm involves determining the expected latency for a probe. The second part of the algorithm uses the information about the expected latency for a probe to compute a fraction of an agent's probes that have anomalous latencies using the original (full) data set. Agents with large fractions of anomalous probes receive high noise scores in the algorithm and are filtered.

18 Claims, 9 Drawing Sheets

(56) References Cited

U.S. PATENT DOCUMENTS

| | | | | |
|---|---|---|---|---|
| 11,522,780 | B1* | 12/2022 | Wallace | H04L 43/0852 |
| 2005/0015511 | A1* | 1/2005 | Izmailov | H04L 12/18 |
| | | | | 709/238 |
| 2005/0081116 | A1* | 4/2005 | Bejerano | H04L 43/0852 |
| | | | | 714/47.2 |
| 2005/0215260 | A1* | 9/2005 | Ahya | H04W 84/02 |
| | | | | 455/452.2 |
| 2006/0153174 | A1* | 7/2006 | Towns-von Stauber | |
| | | | | H04L 1/20 |
| | | | | 370/356 |
| 2008/0082661 | A1* | 4/2008 | Huber | H04L 41/0681 |
| | | | | 709/224 |
| 2009/0028056 | A1* | 1/2009 | Rahman | H04L 45/22 |
| | | | | 370/242 |
| 2014/0280917 | A1* | 9/2014 | Lad | H04L 43/045 |
| | | | | 709/224 |
| 2015/0208306 | A1* | 7/2015 | Kotecha | H04W 36/14 |
| | | | | 455/436 |
| 2017/0054784 | A1* | 2/2017 | Panattu | H04L 43/08 |
| 2017/0149833 | A1* | 5/2017 | Ngo | H04W 24/02 |
| 2018/0062972 | A1* | 3/2018 | Rangappagowda | |
| | | | | H04L 43/0876 |
| 2019/0182141 | A1* | 6/2019 | Shih | H04L 43/0852 |
| 2021/0306245 | A1* | 9/2021 | Bannister | H04L 43/0864 |
| 2021/0352001 | A1* | 11/2021 | Tourrilhes | H04L 43/0876 |

* cited by examiner

DETECTING NOISY AGENTS IN NETWORK MONITORING

BACKGROUND

Large computer networks, such as those used in cloud computing, may contain hundreds or thousands of components of several types, such as switches, routers, and hubs, which are interconnected with links. Generally, network routers receive packets on input ports and transmit the received packets to output ports based on a configuration of the network router. A forwarding table controls which next hops receive the packets. Typically, the forwarding table is programmed in accordance with routing strategies, such as equal-cost multi-path (ECMP) routing, which is a strategy where next-hop packet forwarding to a destination can occur over multiple best paths.

Latency and packet loss are important metrics for testing of a network. Network operations and engineering teams use latency and packet loss determinations to identify and fix network performance problems. The latency experienced between a network source and a network destination is determined by the sum of link propagation latencies for the links on the network path between them, and the sum of the switching and queuing latencies at each router hop that interconnects those links. Networks are dynamic and as changes are made to the network topology and configuration, either by design or by failure, the paths used between a source and a destination can change. As traffic loads change, the queuing latencies at each hop change. As a result, it can be difficult to know what the expected network latencies should be between any source/destination pair. Packet loss occurs when a packet transmitted from a source host server computer is not reached by a destination computer. Packet loss can occur for multiple reasons, such as dropped packets due to an overloaded buffer on a network switch. Both latency issues and packet loss can be resolved using agents that transmit and receive test probes across the network.

DETAILED DESCRIPTION

Active Monitoring (AM) of computer networks helps ensure successful operation of the networks. Telemetry gathered by AM agents are used by network operations and engineering teams to identify and fix network performance problems. The AM agents are typically located in every host attached to the network and often share computing resources with other systems and services that run on the host. If the host is being intensively utilized by those other systems, the AM agent may not get the resources it requires to perform active monitoring. This impacts the data that the AM agent collects, such as packet loss and latency, and, additionally, the telemetry the AM agent sends to a centralized controller of a distributed system. Such a problem with the AM agent increases the packet loss and/or latency statistics, which are interpreted as being degraded network performance. Agents whose data has been affected in this way are said to be noisy, as are the data samples produced by them.

Usually agents probe other agents across the network to determine the network health. If network data from noisy agents is used, it degrades the overall probe statistics. Thus, agents can be identified as noisy and then data from such noisy agents can be excluded from further consideration, thereby improving the quality of the AM dataset. A method executing on a centralized server computer uses a sample of AM probe data. A first part of the method involves determining the expected latency for a probe on a high-quality subset of the original data. The second part of the method uses the information about the expected latency for a probe to compute a fraction of an agent's probes that have anomalous latencies using the original (full) data set. Packets that have timed out (i.e., dropped packets) can be assigned a latency value so that they too can contribute to the algorithm. Agents with large fractions of anomalous probes receive high noise scores in the algorithm and are filtered, thereby improving the overall data set.

Figure 1:
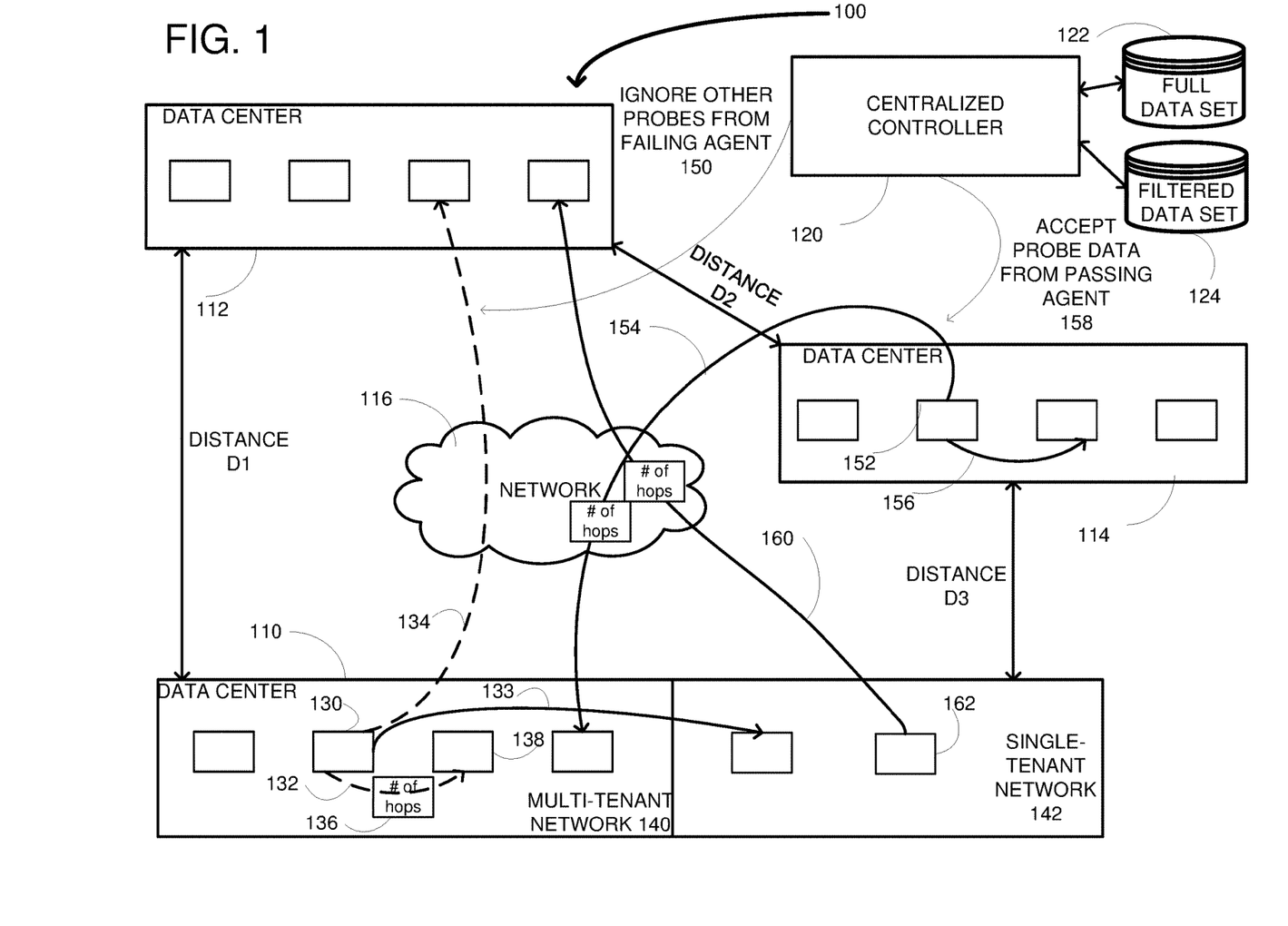
FIG. 1 is a system diagram for detecting noisy agents and modifying active monitoring calculations in response to such a detection.

FIG. 1 is a system diagram for detecting noisy agents and modifying active monitoring calculations in response to such a detection. A distributed system 100 includes multiple data centers 110, 112, 114 coupled together by a network 116 being monitored by a centralized controller 120. The data centers 110, 112, 114 can be in a same region, different geographic regions or different availability zones. Agents transmit and receive network probes throughout the distributed system 100. The probes can have different characteristics based upon where the probe travels within the network, and such probes are said to be of different flow types. For example, probes can be characterized by passing between different data centers based upon the distances between the data centers, by how many hops the probes pass through, by the type of work loads being performed by agents, by whether the probes pass through a single-tenant or multi-tenant network, by whether the probes are intra-data center or inter-data center, etc. Other characteristics of the network probes can be used and the data associated with the network probes can be separated into groups based upon these characteristics.

An agent executing on the server computer 130 in data center 110 is shown transmitting two probes 132, 133 and receiving a probe 134, as indicated by the directional arrows. The probe 132 has a first characteristic in that it is transmitted through a number of hops 136 to a second server computer 138 within the same data center 110. Thus, the probe 132 is an intra-data center probe. A "hop" occurs when a network packet passes through any network device that switches the packet, such as a router. The hop can be any device used for forwarding packet data, including switches (multilayer or single-layer), routers, repeaters, gateways, network bridges, hubs, protocol converters, bridge routers, proxy servers, firewalls, network address translators, multiplexers, network interface controllers, wireless network interface controllers, modems, ISDN terminal adapters, line drivers, and wireless access points, for example. A hop count refers to a number of intermediate network devices between a source and destination through which the packet is transmitted. The probe 133 is passed between a multi-tenant network 140 and a single-tenant network 142. Although probe 133 also passes between multiple hops, the hops are not shown for simplicity. The multi-tenant network 140 is where client traffic is typically located and multiple tenants of a cloud provider share server computers, whereas the single-tenant network 142 is where traffic associated with a cloud provider is typically located and tenant software is generally not executing on server computers. Instead, the cloud provider executes software on the server computers in the single-tenant network 142 in order to provide services to the multi-tenant network. The probe 133 is an intra-data center probe but passes between networks of different types. Finally, the probe 134 is being transmitted from the server computer 130 to a server computer located in a different data center 112 that is a distance D1 from data center 110. Probe 133 is shown in solid lines indicating that it is within a typical latency amount. However, probes 132, 134 are shown in dashed lines indicating that the latency exceeds a threshold. A centralized controller 120 receives the latency data associated with probes 132, 133 and 134. The latency data is stored in a database 122 that includes a full set of probe data. Because each of these probes 132, 133, 134 has different flow types, they are compared to baseline latency values for each separate flow type. The baseline latency values are determined based upon a sample of a number of probes that are considered to be typical. An average of those latencies can define the baseline. However, if any of the probes associated with a flow type exceed a respective threshold for that flow type, all probes from the associated agent are discarded from the overall probe data as indicated at 150 and stored in database 124 as filtered data. Alternatively, the centralized controller 120 can only filter the probe data if an agent has latencies that exceed the threshold in at least two different flow types. For example, as indicated by dashed lines, the probe 132 and 134 exceed the baseline thresholds for intra-data center probes and inter-data center probes. Because the agent on server computer 130 has failing probes of two different types, all probe data including probe 133 (which does not exceed the threshold) is filtered.

Probes between data centers 112, 114 can be categorized differently based on the distance D2. Likewise, probes between data centers 110, 114 can be categorized based on distance D3. Generally, a longer distance can be associated with a larger number of hops. For example, an agent executing in a server computer 152 in data center 114 transmits a probe to a destination server computer in data center 110. Another probe 156 is transmitted from the same agent in the server computer 152 to a different server computer in the same data center. If these individual probes of different types have not exceeded a threshold deviation from a baseline latency, then the centralized controller 120 uses the latency data, as indicated at 158. Still a further flow type is illustrated by a probe 160 transmitted from a server computer 162 in the single-tenant network 142 to the data center 112, which can be a multi-tenant network or a single-tenant network. Thus, different flow types can be associated with different baseline latency values. The centralized controller 120 can receive a plurality of network probe data from which it can derive latency information for probes transmitted through the network. The network probes can be categorized based on paths traveled through the network, such as whether the probes traveled greater than a threshold distance, whether the probes traversed greater than a threshold number of hops, whether the probes traversed a single-tenant network or multi-tenant network, etc. Each different category can have different baseline latencies that are considered typical. Any latencies that differ from the baseline latencies greater than a predetermined amount, can be considered faulty. If a single agent has multiple faulty latency in different flow types, then it is an indicator that the agent itself is faulty. Accordingly, the centralized controller 120 can exclude any latency data associated with a faulty agent from the filtered data set 124. In this way, a better assessment can be made for test probes that traverse the network. In an additional aspect, the centralized controller 120 can adjust latency determinations as opposed to ignoring the test probes. For example, a latency determination of a test probe can have the predetermined latency subtracted from it to adjust the overall latency based on the noisy agent. In some cases, the agent itself can adjust latency and the resultant latency-adjusted data can then be transmitted to the centralized controller 120.

The centralized controller 120 can also receive packet loss data (e.g., dropped packets or packets that timed out) from the various agents as part of the total packet data received. In order to include the packet loss data into the overall analysis without skewing the baseline latency numbers, a predetermined latency value is assigned to each packet lost. The packet loss data, having been converted or transformed to latency data, can be combined with the other latency data to be included in the overall latency analysis.

Figure 2:
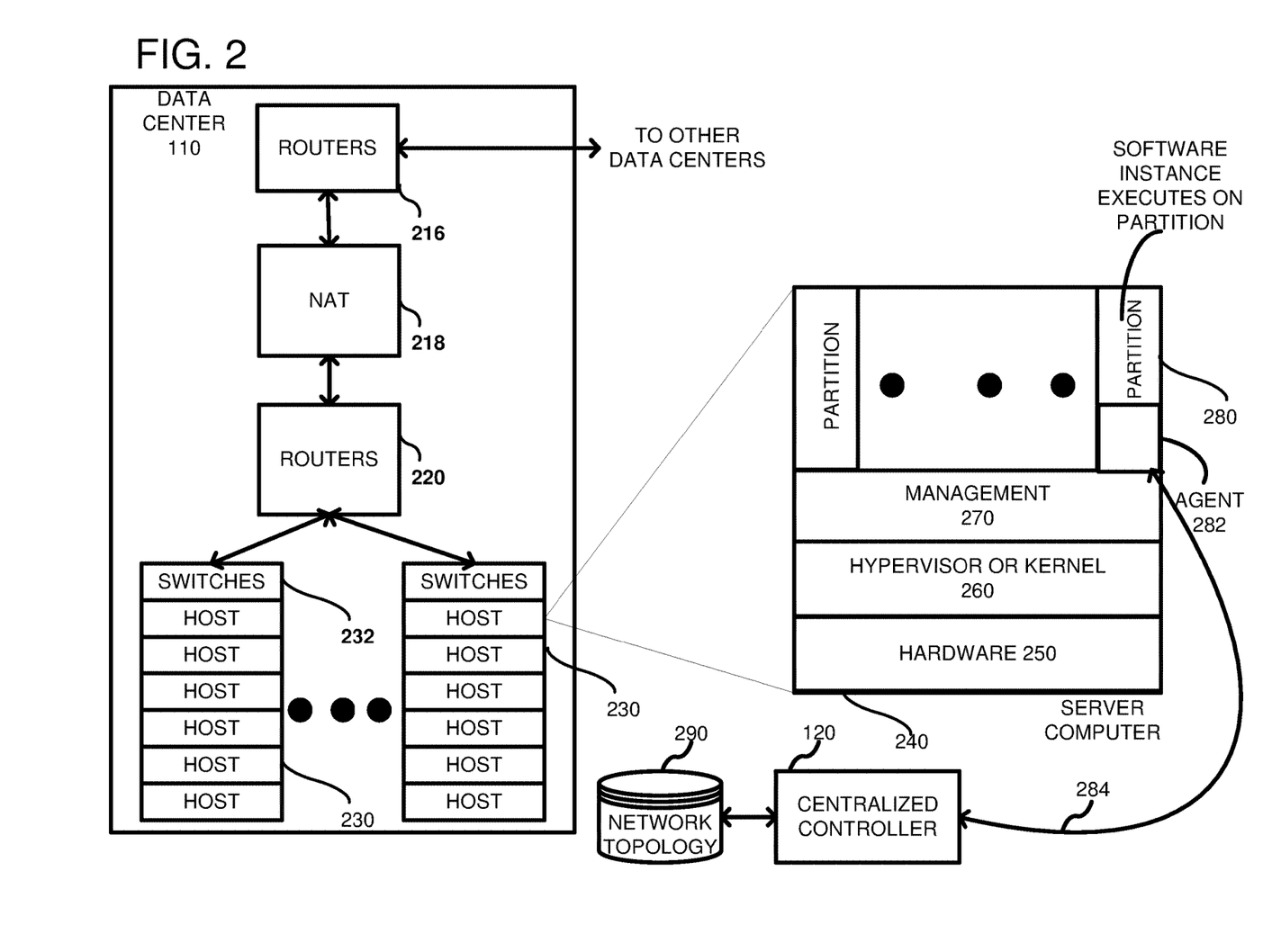
FIG. 2 illustrates further details of a data center shown in FIG. 1.

FIG. 2 illustrates further details of the data center 110, which is coupled to other data centers by routers 216. The routers 216 read address information in a received packet and determine the packet's destination. If the router decides that a different data center contains a host server computer, then the packet is forwarded to that data center. If the packet is addressed to a host in the data center 110, then it is passed to a network address translator (NAT) 218 that converts the packet's public IP address to a private IP address. The NAT also translates private addresses to public addresses that are bound outside of the data center 110. Additional routers 220 can be coupled to the NAT to route packets to one or more racks of host server computers 230. Each rack 230 can include a switch 232 coupled to multiple host server computers. A particular host server computer is shown in an expanded view at 240.

Each host 240 has underlying hardware 250 including one or more CPUs, memory, storage devices, etc. Running a layer above the hardware 250 is a hypervisor or kernel layer 260. The hypervisor or kernel layer can be classified as a type 1 or type 2 hypervisor. A type 1 hypervisor runs directly on the host hardware 250 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 270 can be part of the hypervisor or separated therefrom and generally includes device drivers needed for accessing the hardware 250. The partitions 280 are logical units of isolation by the hypervisor. Each partition 280 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions.

Any applications executing on the instances can be monitored using the management layer 270, which can then pass the metrics to the centralized controller 120. Additionally, the management layer 270 can pass to the centralized controller 120, the number of instances that are running, when they were launched, the operating system being used, the applications being run, when packets are received or transmitted (latency information), packet loss information, etc. All such metrics can be used for consumption by the centralized controller 120 and stored in a database. Additionally, an agent 282 can execute on one of the partitions 280 and transmit latency and packet loss information to the centralized controller 120, as shown at 284. For example, network probes can be transmitted through the network and when received by the agent 282, the agent transmits the packet identifier and a timestamp of when the packet was received to the centralized controller 120. Other information can be included in the packet, such as a source and destination of the packet. Additionally, the centralized controller 120 can inject packets into the network by passing packets to the agent 282, which can, in turn, re-transmit the packet through the network. Although not shown, the agent 282 can also be positioned within the hypervisor or kernel layer 260 or within the hardware 250. The centralized controller 120 can use the packets described herein to determine a number of hops traversed in the network, the flow types, and the distances traversed using network topology from a database 290. The latency information can be used to determine which agents within the network are faulty.

Figure 3:
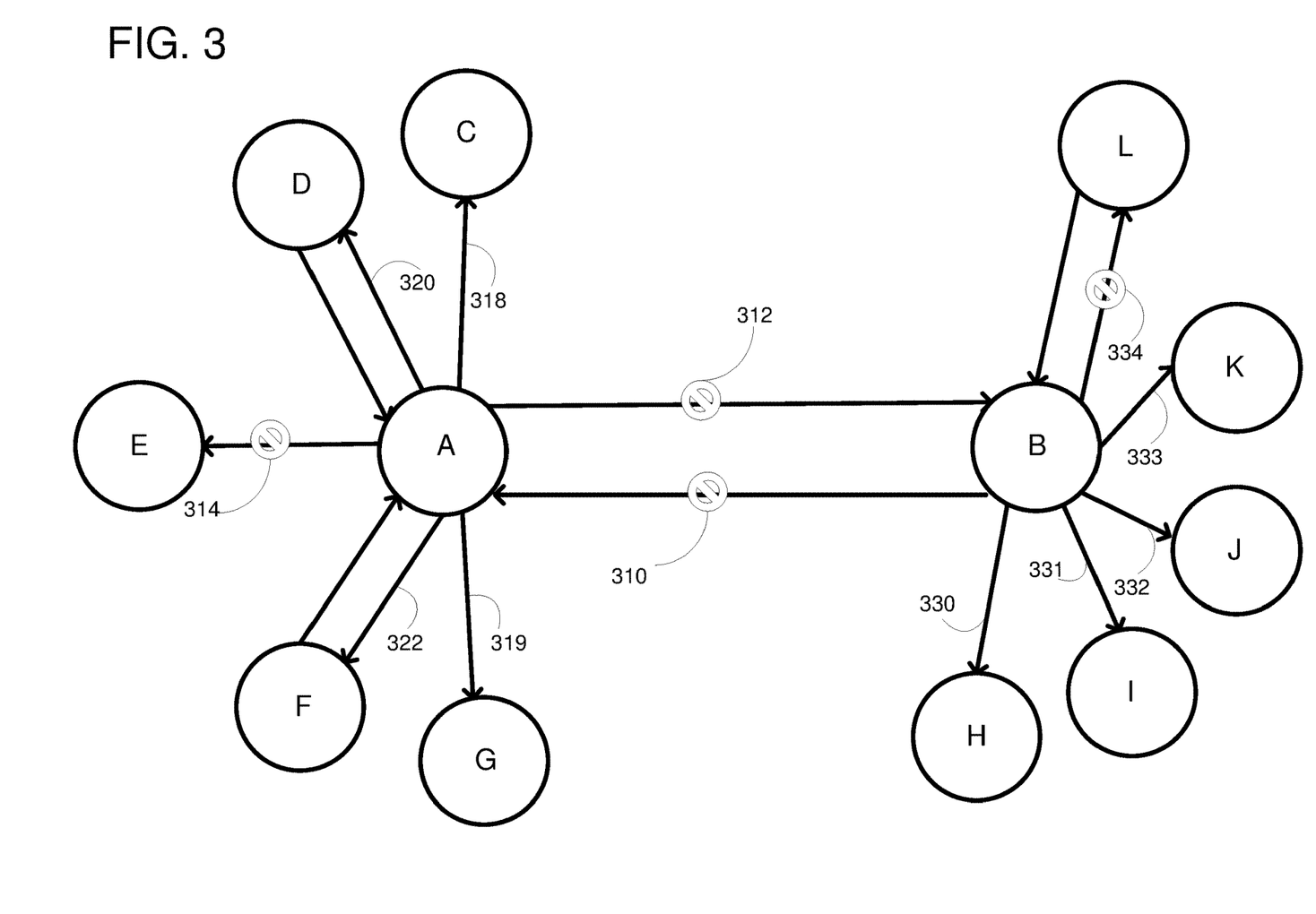
FIG. 3 shows a plurality of agents sending and receiving network probes.

FIG. 3 shows a plurality of agents sending and receiving network probe packets. Agents A and B are both transmitters and receivers of network probe packets, as indicated by the directional arrows from agents C-L. In some cases, the agents A, B are transmitting packets, and, in other cases, the agents are responding to received packets. The NOT symbol, such as is shown at 310, represents that the latency of the packet exceeded a desired threshold indicating that the agent associated with the packet can be problematic. In this case, agent A transmits 2 packets that are problematic due to latency, as shown as 312, 314. Transmitted packets 318 and 319 are within a normal latency range. Additionally, responses 320, 322 to received packets are also in a normal latency range. Agent B transmits 4 packets that have acceptable latency at 330-333 and returns packets 310, 334 that are problematic due to latency. A table indicating the latency of agents A and B is shown below.

| Agent | Combined Score | Transmitter | Receiver |
|-------|----------------|-------------|----------|
| A     | 2/6            | 2/4         | 0/2      |
| B     | 2/6            | 0/4         | 2/2      |

As can be seen, agent A transmitted a total of 6 packets with 2 having latency issues and both times agent A was a transmitter instead of responding to a received packet. Agent B also had two latency issues, both times when it was responding to a received packet. Using such information, noise scores can be computed per agent role, such as by evaluating the fractions in the table above, and by computing an average latency deviation using a sum of deviations and the total number of flows.

Figure 4:
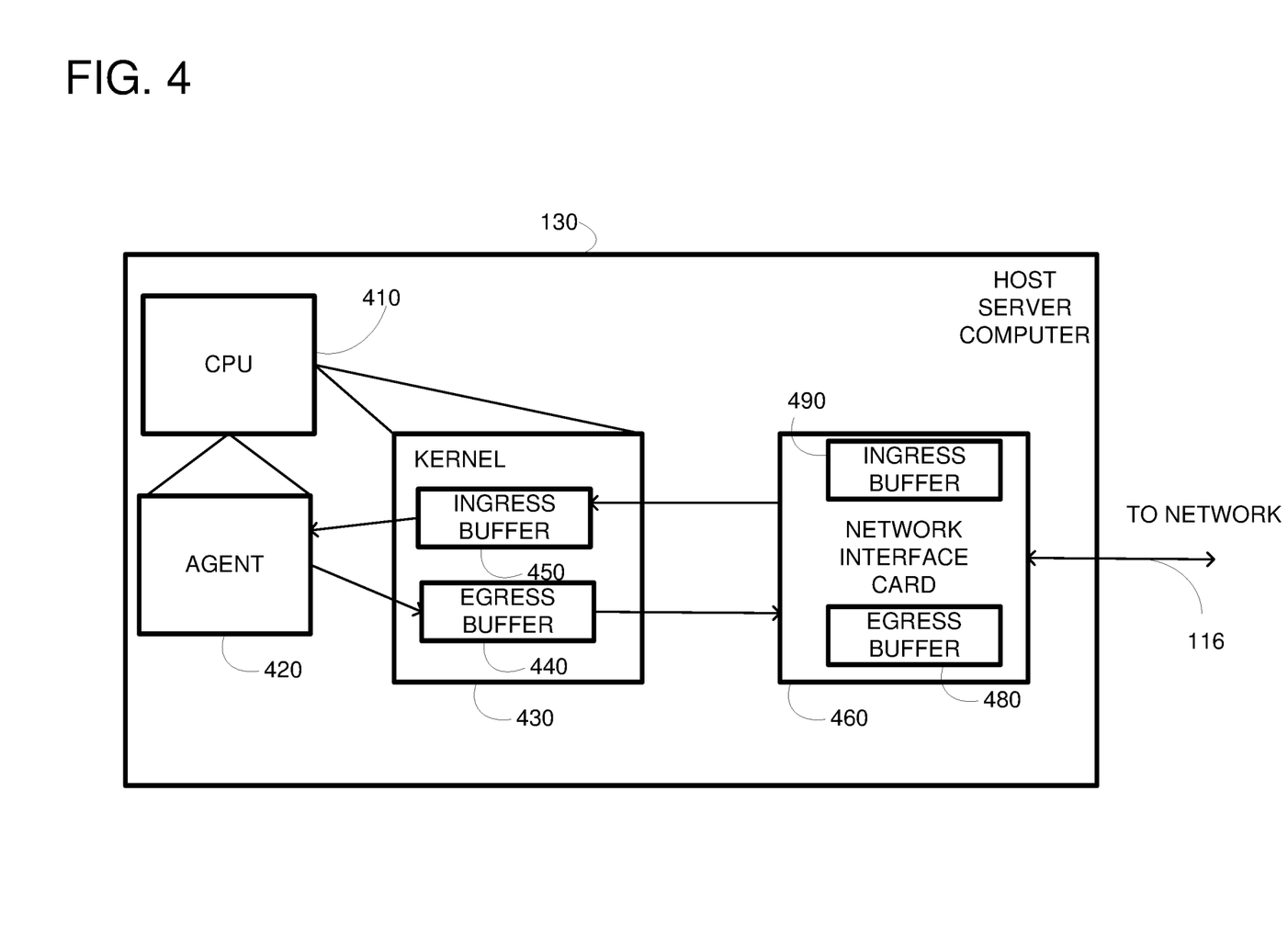
FIG. 4 is an example embodiment of the host server computer with an agent executing thereon and showing a buffer structure for receiving and transmitting network probes.

FIG. 4 is an example embodiment of the host server computer 130. The host server computer 130 includes a CPU 410 upon which an agent application 420 is executed. Additionally, a kernel 430 executes on the CPU 410 and the kernel includes egress buffer 440 and an ingress buffer 450. Packets in the egress buffer 440 having a destination outside of the host server computer 130 are passed to a network interface card 460 (NIC) for transmission over the network 116. Additionally, packets from the NIC are passed to the ingress buffer 450 and delivered to the application having the appropriate address designated by the packet. The NIC also includes an egress buffer 480 and an ingress buffer 490. Packets being transmitted to the network 116 pass through both the egress buffer 440 of the kernel and the egress buffer 480 of the NIC. Either egress buffer can be problematic. Additionally, network packets received from the network 116 are passed through the ingress buffer 490 of the NIC and the ingress buffer 450 of the kernel. When the agent A receives a packet and responds to the packet, the latency issues can be associated with the ingress buffers 450, 490 or the egress buffers 440, 480. However, when transmitting packets, only the egress buffers 440, 480 are analyzed. As a result, dividing the analysis into whether the agent is a transmitter or receiver provides different information relating to any latency or packet loss that is occurring.

Figure 5:
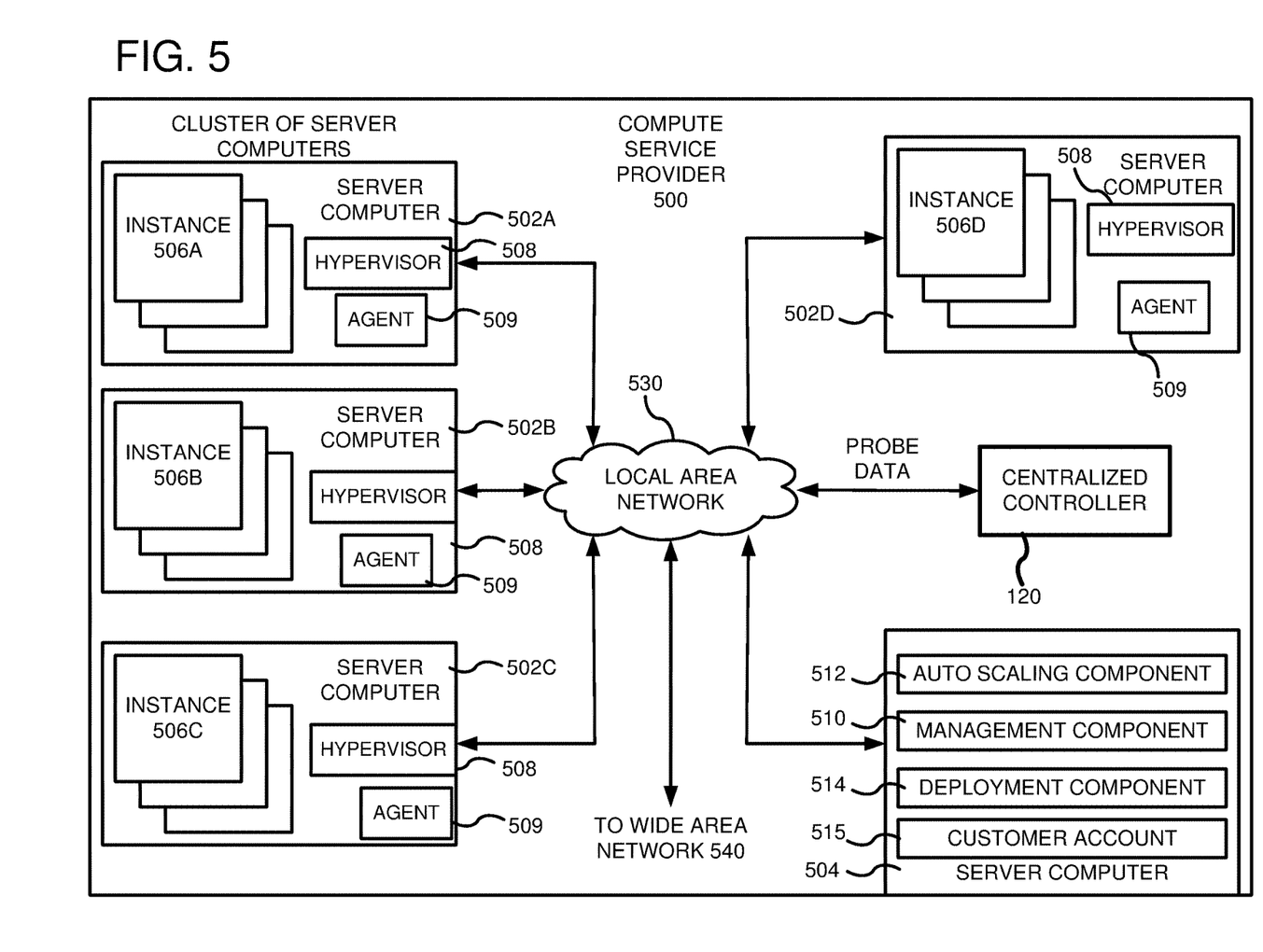
FIG. 5 is a computing system diagram of a network-based compute service provider that illustrates one environment in which embodiments described herein can be used.

FIG. 5 is a computing system diagram of a network-based compute service provider 500 that illustrates one environment in which embodiments described herein can be used. By way of background, the compute service provider 500 (i.e., the cloud provider) is capable of delivery of computing and storage capacity as a service to a community of end recipients. In an example embodiment, the compute service provider can be established for an organization by or on behalf of the organization. That is, the compute service provider 500 may offer a "private cloud environment." In another embodiment, the compute service provider 500 supports a multi-tenant environment, wherein a plurality of customers operate independently (i.e., a public cloud environment). Generally speaking, the compute service provider 500 can provide the following models: Infrastructure as a Service ("IaaS"), Platform as a Service ("PaaS"), and/or Software as a Service ("SaaS"). Other models can be provided. For the IaaS model, the compute service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 500 using networked client devices, such as desktop computers, laptops, tablets, smartphones, etc. running web browsers or other lightweight client applications. Those skilled in the art will recognize that the compute service provider 500 can be described as a "cloud" environment.

In some implementations of the disclosed technology, the computer service provider 500 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/ or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The particular illustrated compute service provider 500 includes a plurality of server computers 502A-502D. While only four server computers are shown, any number can be used, and large centers can include thousands of server computers. The server computers 502A-502D can provide computing resources for executing software instances 506A-506D. In one embodiment, the instances 506A-506D are virtual machines. As known in the art, a virtual machine is an instance of a software implementation of a machine (i.e. a computer) that executes applications like a physical machine. In the example of virtual machine, each of the servers 502A-502D can be configured to execute a hypervisor 508 or another type of program configured to enable the execution of multiple instances 506 on a single server. Additionally, each of the instances 506 can be configured to execute one or more applications. A particular application that can execute on one or more instances 506 or run on the hypervisor, is an agent 509. The agent 509 can receive test packets and transmit latency information to the centralized controller 120. The latency information can include a packet identifier as well as timing information so that latency of each packet can be determined by the centralized controller 120. The agent 509 can also transmit packets for receipt by other agents on the network in order to assist the centralized controller in latency determinations. In one embodiment, the agent 509 can transmit a test packet upon request from the centralized controller 120 and report back to the centralized controller a time that the packet was transmitted together with an identifier of the packet. Additional information can include a source and destination IP address. Other information can be provided depending upon the implementation.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 504 can be reserved for executing software components for managing the operation of the server computers 502 and the instances 506. For example, the server computer 504 can execute a management component 510. A customer can access the management component 510 to configure various aspects of the operation of the instances 506 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 512 can scale the instances 506 based upon rules defined by the customer. In one embodiment, the auto scaling component 512 allows a customer to specify scale-up rules for use in determining when new instances should be instantiated and scale-down rules for use in determining when existing instances should be terminated. The auto scaling component 512 can consist of a number of subcomponents executing on different server computers 502 or other computing devices. The auto scaling component 512 can monitor available computing resources over an internal management network and modify resources available based on need.

A deployment component 514 can be used to assist customers in the deployment of new instances 506 of computing resources. The deployment component can have access to account information associated with the instances, such as who is the owner of the account, credit card information, country of the owner, etc. The deployment component 514 can receive a configuration from a customer that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 514 can utilize the customer-provided configuration and cache logic to configure, prime, and launch new instances 506. The configuration, cache logic, and other information may be specified by a customer using the management component 510 or by providing this information directly to the deployment component 514. The instance manager can be considered part of the deployment component.

Customer account information 515 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 530 can be utilized to interconnect the server computers 502A-502D and the server computer 504. The network 530 can be a local area network (LAN) and can be connected to a Wide Area Network (WAN) 540 so that end users can access the compute service provider 500. It should be appreciated that the network topology illustrated in FIG. 5 has been simplified and that many more networks and networking devices can be utilized to interconnect the various computing systems disclosed herein.

Figure 6:
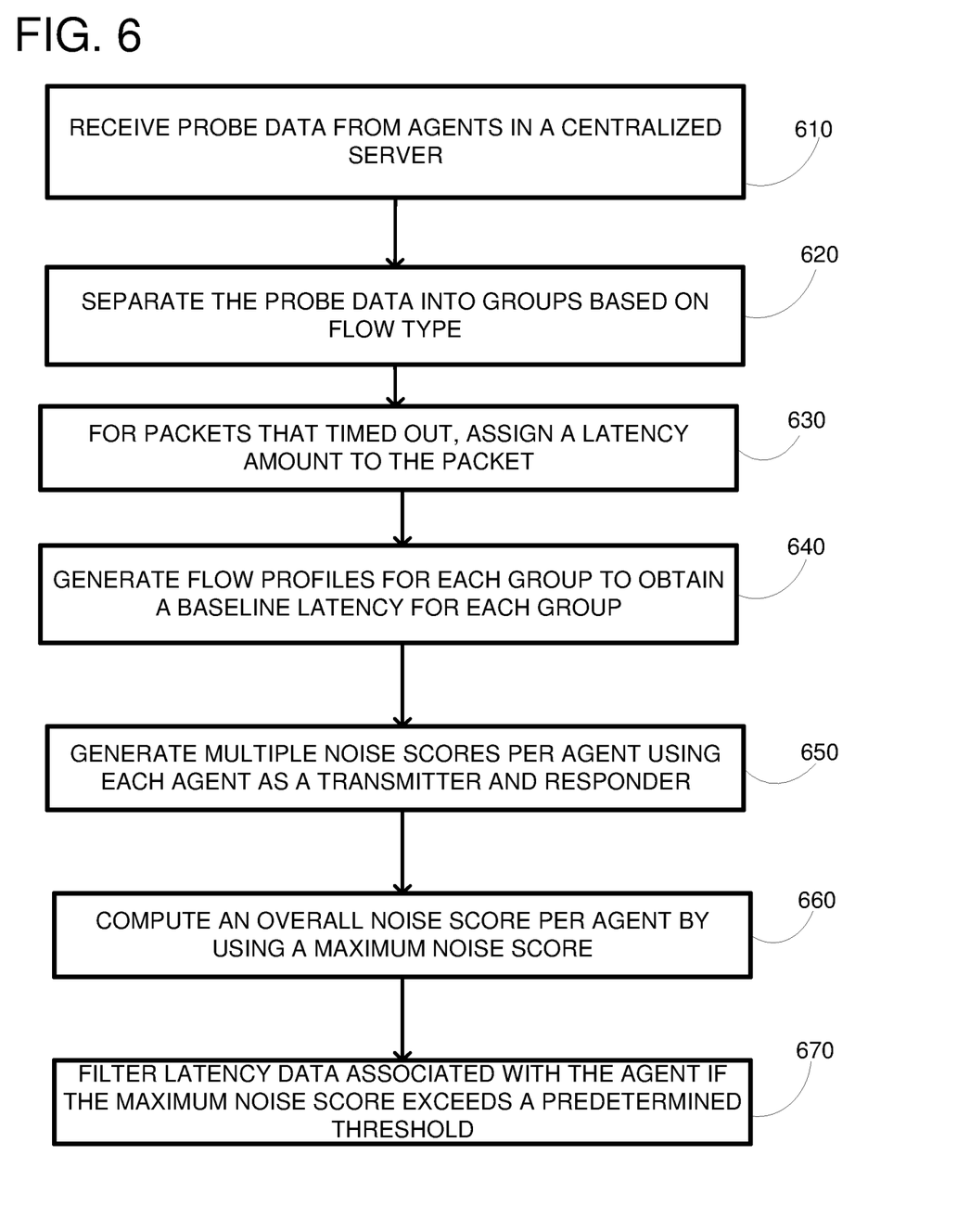
FIG. 6 is a flowchart according to one embodiment to determine whether an agent is noisy and, if so, filter probe data associated with that agent.

FIG. 6 is a flowchart according to one embodiment to determine that an agent is noisy and, if so, filter probe data associated with that agent. In process block 610, probe data is received from agents in a centralized server computer. For example, in FIG. 1, the centralized controller 120 can receive probe data associated with probes transmitted through the system 100. The probe data can be stored in the database 122. The probe data originates by the agents transmitting test packets (also called test probes) to predetermined IP addresses so as to test latency and packet loss. In process block 620, the received probe data is separated into groups based upon a flow type. The flow type depends upon the characteristics of where the probes associated with the probe data traveled in the network. Example flow types include, for example, whether probes are inter-data center or intra-data center, whether the probes originated from a particular type of agent (different agents have different work loads based on type), whether the probes passed through more than a threshold number of hops, whether the probes passed through a single-tenant or multi-tenant environment, etc. The designation of the flow type can be maintained in the full data-set database 122. In process block 630, for packets that timed out (e.g., dropped packets or packets that have timed out (e.g., more than 500 ms)), a latency value can be assigned to the packet. For example, so as not to distort any determined average latency, a predetermined latency value can be used and replace the latency of the dropped packet. In process block 640, flow profiles are generated for each group to obtain a baseline latency per group. For example, an average latency can be obtained for all probes in a group to obtain a baseline. The baseline is a value that represents what an expected latency should be for probes of that flow type. A threshold can be set to establish acceptable deviations in latency values from the baseline. In process block 650, multiple noise scores are generated per agent using each agent as a transmitter and a responder for the different flow types. There are a variety of techniques for determining whether an agent is noisy. In one technique, an analysis is performed wherein if an agent has a number of probes with high latency and for at least two different flow types, then the agent is noisy. A high latency is considered one that deviates from the baseline for the particular flow type. Separate analysis can be performed depending on whether the agent is transmitting probes or responding to received probes. A threshold number of probes should be reached to constitute an adequate sample size. For example, a minimum of 10 probes per agent, an average of 25 probes per agent and a maximum of 50 probes per agent can be used. Other numbers can be used based on how the algorithm is tuned. The maximum number is chosen to ensure that the agent is not noisy due to transmission of excessive probes. In process block 660, an overall noise score per agent is determined using a maximum score from the different scores obtained in process block 650. Other techniques can be used for determining the noise score per agent, such as averaging the different noise scores from process block 650. In process block 670, if the noise score of the agent exceeds a predetermined threshold, then all probes from that agent are filtered from the full data set. The threshold is a parameter that can be set to tune the algorithm to achieve a desired result. Thus, in FIG. 1, the filtered data set 124 is derived from the full data set 122, but with noisy agent data removed. More specifically, all probe latency data is removed associated any agents considered noisy.

Thus, the algorithm operates on a sample of active monitoring probe data. The first part of the algorithm involves determining the expected latency for a probe on an aggressively filtered high quality subset of the original data. The second part of the algorithm uses the information about the expected latency for a probe to compute the fraction of an agent's probes that have anomalous latencies. Typically, the full data set is used for this analysis. Agents with large fractions of anomalous probes receive high noise scores in the algorithm, which results in such agents being filtered from an overall latency analysis. Conversely, agents with small fractions of anomalous probes receive low noise scores and such agents have probe data included in the overall latency analysis.

The first part of the algorithm builds a latency profile for each flow type, which can be called a flow profile. The data used for the flow profile is derived from the overall probe data with aggressive data quality filters to remove as much noise as possible. Data is then grouped by metadata that are expected to dictate the minimum latency for a flow. The following are examples of such metadata:

1) What data centers the transmitting and receiving agents are located within. The distances between the data centers, the optical equipment used, the link encryption, etc.

2) What agent-type pair is involved in the probing. This can be relevant because the agents have different workloads depending on type. More specifically, the agent pair relates to the transmitting and receiving agents associated with the test probes. The agents are said to be of different types as defined by the workload being performed.

3) What is the hop count between the agents. This can be relevant because each hop adds a certain amount of latency.

4) What is the service path of the probes, such as whether it passed within a multi-tenant environment, within a single-tenant environment, or between the multi- and single-tenant environments.

5) Whether the probes are within a data center or between data centers. This can be relevant because the hops can create different latencies depending on use.

For each group, the minimum latency is recorded, as well as some higher percentile above which a probe is considered to be noisy (e.g., 90%, listed as "noise latency" in the schema described below).

The flow profile data set can have the following schema, but other schemas can be used:

| Field | Data Type | Data Usage | Example |
| --- | --- | --- | --- |
| Ordered data center pair | string | key | Data center 7-8 |
| ordered_agent_type_pair | string | key | Agent type |
| hop_count | integer | key | 14 |
| service_path | string | key | Multi-tenant |
| flow_type | string | key | intra_dc |
| samples | integer | value | 3178 |
| min_latency | integer | value | 200.0 |
| noise_latency | integer | value | 293.0 |

The second part of the algorithm determines the proportion of each agent's probes that are above a threshold, which results in a noise score data set. The noise score data set contains, for every agent, counts of the number of flows, distinct counts of flow types, as well as counts of flows that are above the level considered to be noisy (e.g., 90%). It also contains sums of the flow deviations from the flow profile minima. Flows where the agent is performing the role of a transmitter (i.e., initiator) or responder are counted separately because the noise signal can be stronger in flows where the agent is performing the responder role. The noise score data set can have a schema including a transmitter probe count, a transmitter latency deviation, a transmitter noise probe count, a number of distinct flow types for the agent, the agent's noise score, and the transmitters average latency deviation. The same schema can be used for the responder. Limits can be set on using data when the number of samples are small. The larger the sample size, the increased accuracy of the data.

The algorithm proceeds as follows:

Various parameters can be chosen for the algorithm, such as setting the noise percentile, the average deviation, the noise score, a latency value for dropped probes, etc.

Next, the noise score data set is built. The network performance data is enriched with noise scores (e.g., 2 per agent) and average latency deviations (e.g., 2 per agent).

A noise score is computed by taking the following:

max_noise_score=MAX(Transmitter_initiates_noise_score, transmitter_responds_noise_score, responder_initatiates_noise_score, responder_responds_noise_score);

max_noise_deviations=MAX(Transmitter_initiates_noise_deviations, transmitter_responds_noise_deviations, responder_initatiates_noise_deviations, responder_responds_noise_deviations)

The transmitter_initiates_noise_score relates to the noise score obtained for probes initiated by a first agent (the transmitting agent) to a second agent (a responding agent). The transmitter_responds_noise_score relates to the noise score obtained for probes that were received by the first agent from the second agent and the first agent responded to the received probes. The responder_initiates_noise_score relates to the noise score for probes initiated by the second agent to the first agent. The responder_responds_noise_score relates to the second agent responding to probes received by the first agent. A similar naming convention is used for the noise deviations that relate to a difference between the noise score and a baseline score.

The filtered network performance data set can be as follows:

max_noise_score<=the noise score parameter setting.

max_noise_deviations<=the average deviation parameter setting.

Figure 7:
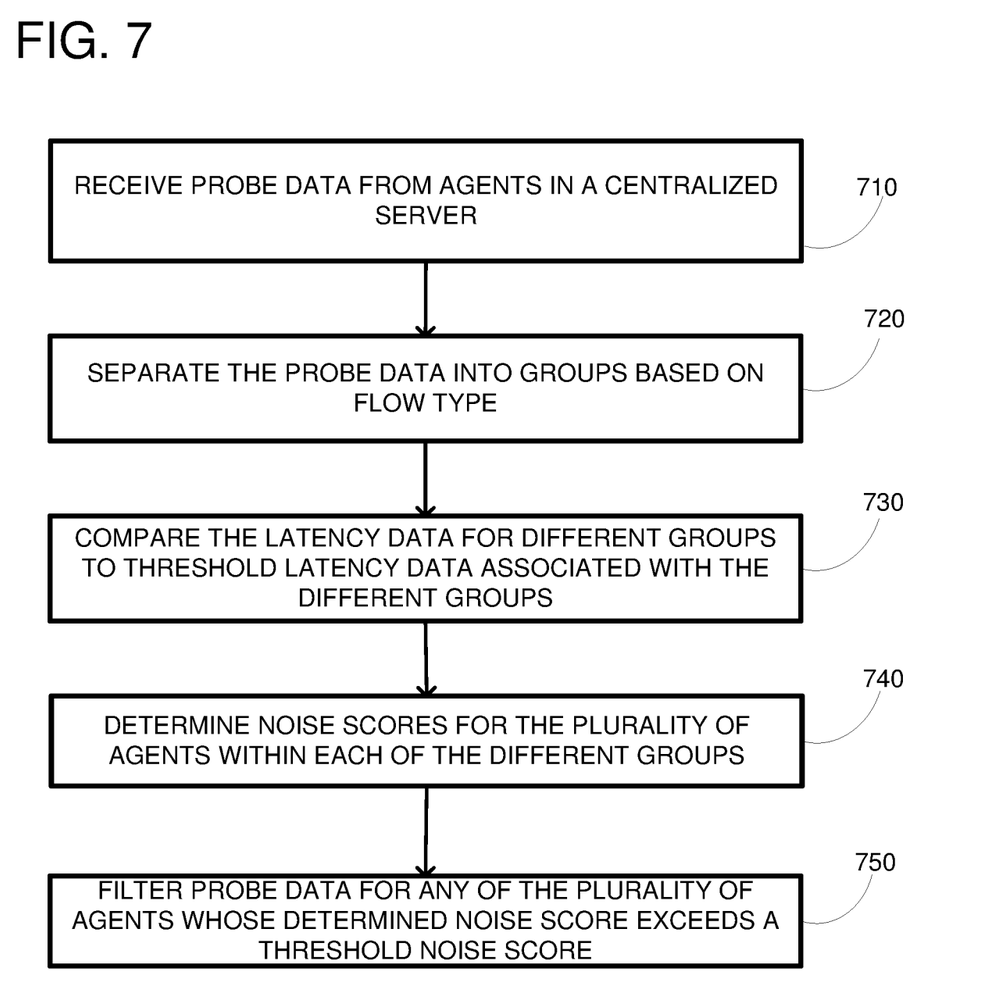
FIG. 7 is a flowchart according to one embodiment for detecting a noisy agent.

FIG. 7 is a flowchart according to one embodiment for detecting noisy agents. In process block 710, probe data is received from agents in a centralized server. For example, in FIG. 2, an agent 282 transmits a probe to the centralized controller 120, which executes on a server computer. As shown in FIG. 5, the centralized controller 120 generally receives probe data from multiple agents 509 in the network. In process block 720, the probe data is separated into groups based upon a flow type. Using the source and destination computers, plus network topology data (e.g., see FIG. 2 at 290), the centralized controller 120 can determine a flow type for the probe data and store the flow type with its associated packet in the database including the full set of probe data (e.g., see database 122, FIG. 1). For example, in FIG. 1, the server computer 152 in data center 114 transmits a packet to a server computer in data center 110, as shown at 154. The centralized controller 120 can use topology data to compute the number of hops traversed through the network 116 and categorize the packet data based upon the number of hops. Specific numbers of hops can be used to dictate a flow type, such as 10 hops is a first flow type, 12 hops is a second flow type, etc. Ranges can also be used wherein the number of hops is within a range (e.g., between 10 and 20 is one flow type, between 21 and 30 is another flow type, etc.) In process block 730, latency data for the different groups is compared to threshold latency data associated with the different groups. For example, the centralized controller 120 can determine baseline latency data based upon a historic sample of the number of packets. For example, if packets traverse a certain number of hops, the latency can be expected within a certain range. In process block 740, noise scores can be determined for a plurality of agents within each of the different groups. For example, each different group associated with a flow type can have a different associated latency. Thus, a single agent can generate packets of different flow types based upon characteristics of network devices that the packet traversed in being routed from the source to the destination. For example, the characteristics can be related to how many network devices were traversed or the type of network devices. The noise scores can be determined by comparing a packet latency within a certain group to the baseline latency. In process block 750, probe data can be filtered for any of the plurality of agents whose determined noise score exceeds a threshold noise score. More particularly, if the noise score exceeds a threshold amount above the baseline, then the packet is considered anomalous. A further evaluation can be performed to determine that the same agent is associated with anomalous packets of different flow types. For example, to conclude that an agent is noisy, it can be required that the agent have at least two packets of different flow types that are anomalous in order for the agent to be considered noisy. Once an agent is considered noisy, any latency data associated with that agent can be filtered.

Figure 8:
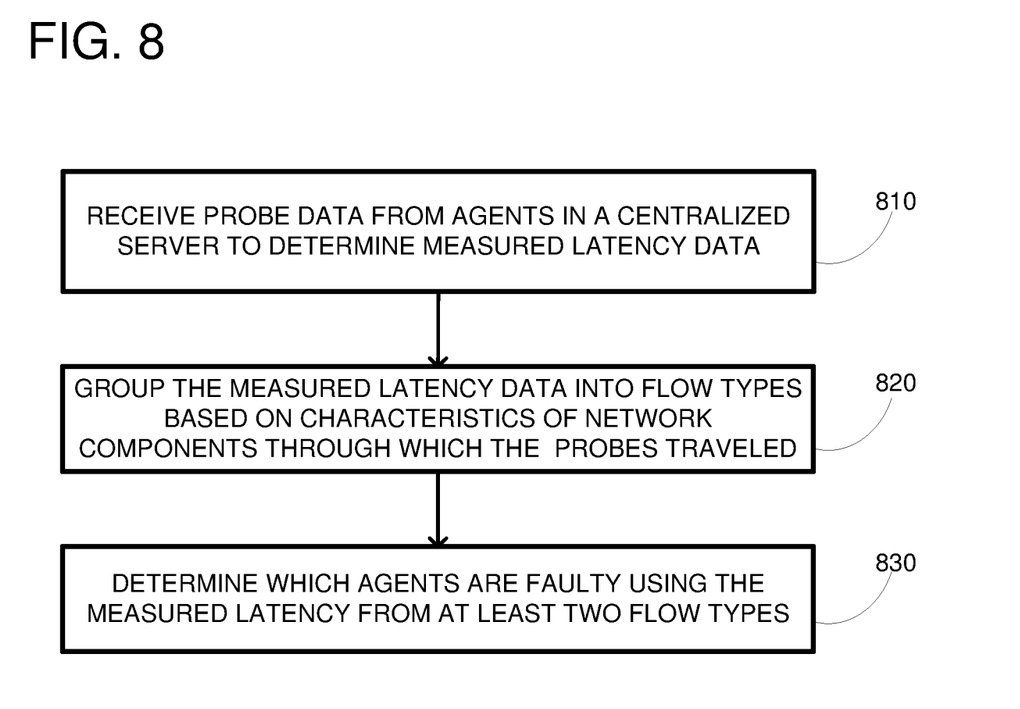
FIG. 8 is a flowchart according to another embodiment for detecting a noisy agent.

FIG. 8 is a flowchart according to another embodiment for detecting a noisy agent, which is an agent executing on a server computer that causes high latency, such as due to overloaded ingress or egress buffers. In process block 810, probe data is received from agents in a centralized server. The probe data can include latency information, source and destination IP addresses, time stamp information, etc. In FIG. 5, for example, the centralized controller 120 receives probe data from multiple agents 509 operating on server computers 502A-502D. The probe data can be used to derive latency data associated with the probes. In process block 820, the centralized controller can group the latency data into flow types based upon characteristics of the network components through which the probes traveled. The characteristics can relate to a type of network switch through which the probe travels, a type of network through which the probe travels, a number of hops, a distance traveled between data centers, etc. In process block 830, a determination is made as to whether the agents are faulty using the measured latency from at least two flow types and comparing the measured latencies to the baseline latency associated with each flow type. Thus, an agent is not considered faulty (generating probes with high latency) unless multiple probes have high latency and the probes are from different flow types, which increases the likelihood that the problem lies with the agent itself instead of other network components. In some embodiments, a number of faulty probes from an agent should exceed a minimum sample size in order to further ensure that the agent is faulty (e.g., noisy).

Figure 9:
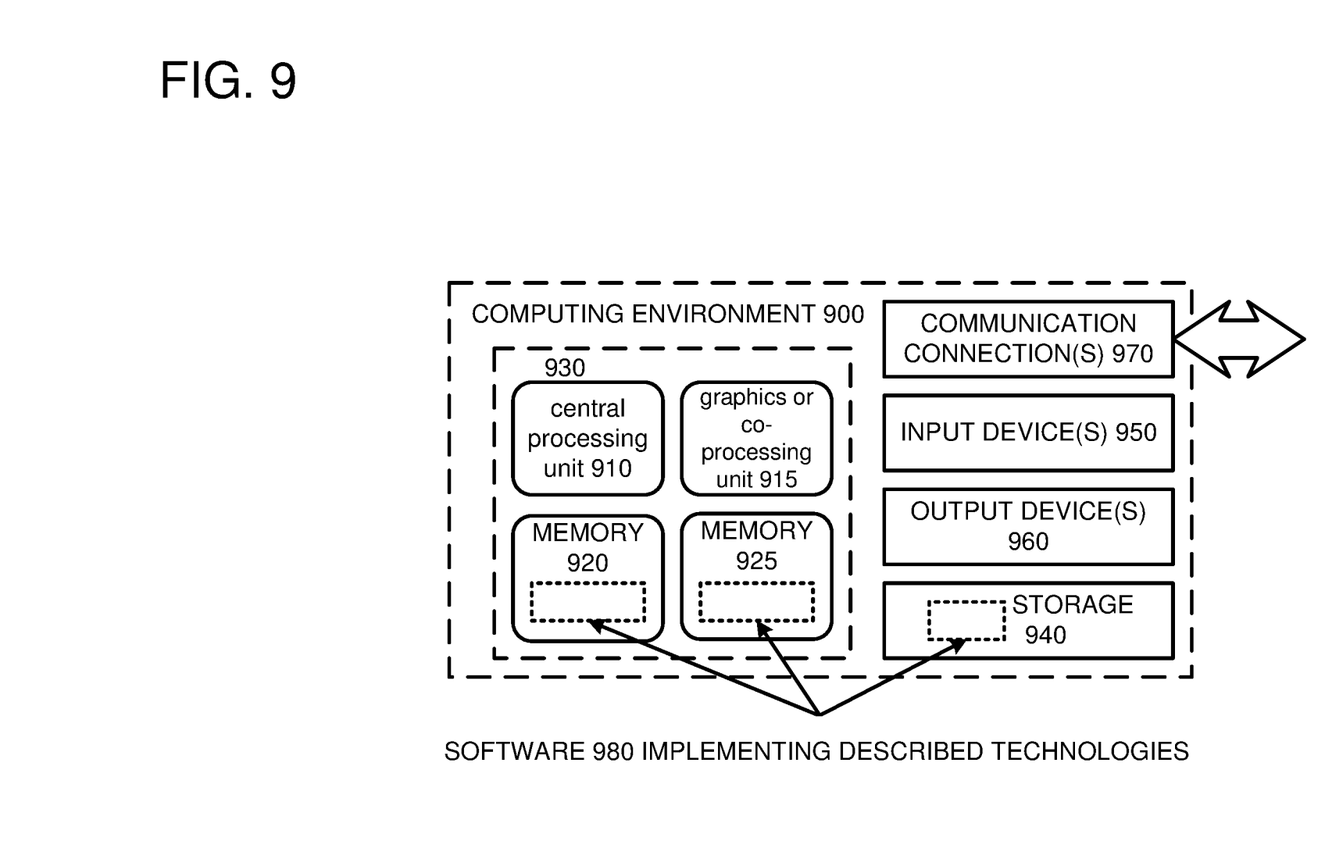
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.).

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein. For example, the storage 940 can store instructions for implementing the centralized controller described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of detecting anomalies in a network, the method comprising:
   receiving probe data from a plurality of agents in the network, wherein the probe data includes latency data for transmission of probes from a respective source host server computer to a respective destination host server computer through a plurality of network devices;
   separating the probe data into different groups based on characteristics of where the probes traveled within the network, wherein at least one of the different groups is based upon a distance that the probes traveled in the network;
   comparing the latency data for the different groups to baseline latency data associated with each of the different groups;
   determining a noise score for each of the plurality of agents using the comparison, wherein the noise score accounts for the at least one group that is based upon the distance that the probes traveled in the network, and wherein the noise score includes latency data for at least two of the different groups so as to determine that an agent is faulty, rather than paths upon which the probes traveled being faulty; and
   filtering the probe data for the agent whose determined noise score exceeds a threshold noise score to ignore the latency data as being received from the agent that is faulty.

2. The method of claim 1, wherein the characteristics include whether the probes were transmitted between different data centers.

3. The method of claim 1, wherein the probe data further includes packet loss data and the method includes transforming the packet loss data into assigned latency data and combining the assigned latency data with the latency data.

4. The method of claim 1, wherein the determining the noise scores includes comparing the latency data for an agent separately for flows where the agent is a transmitter and a responder.

5. The method of claim 1, further including determining the baseline latency data for each of the different groups by determining a typical latency for the different groups.

6. A method, comprising:
   receiving network probe data from a plurality of agents for network probes transmitted through a network to determine measured latency data, wherein each of the plurality of agents executes on a respective host server computer in the network;
   grouping the measured latency data associated with the network probes into flow types based on characteristics of network components through which the network probes traveled, wherein a first of the flow types is associated with a distance that the network probes traveled;
   determining which of the plurality of agents are faulty using the measured latency data from at least two of the flow types, including the first flow type that is associated with the distance that the network probes traveled; and ignoring the measured latency data from the agents that are determined to be faulty.

7. The method of claim 6, wherein the determining which of the plurality of agents are faulty comprises:

for each flow type of network probes, determining a baseline expected latency;

comparing the baseline expected latency and the measured latency data for the plurality of agents in each flow type; and determining which of the plurality of agents are faulty based on the comparison.

8. The method of claim 6, further including grouping the measured latency data based on whether an agent, in the plurality of agents, is a transmitter or responder in the transmitting of the network probes.

9. The method of claim 6, further including detecting a packet timeout and transforming the packet timeout into a corresponding latency value to be used in place of a measured latency when comparing to the baseline.

10. The method of claim 6, wherein the determining which of the plurality of agents are faulty includes using the at least two flow types in which the measured latency data of an agent of the plurality of agents exceeds a baseline expected latency by a threshold amount.

11. The method of claim 6, wherein one of the flow types has a characteristic that the network probe travels greater than a predetermined distance between data centers.

12. The method of claim 6, wherein one of the flow types has a characteristic that the network probe traverses a specific number of hops.

13. The method of claim 6, further including determining whether a threshold number of samples has been reached before determining one of the plurality of agents is faulty.

14. One or more non-transitory computer-readable media comprising computer-executable instructions that, when executed, cause a computing system to perform a method comprising:

receiving test probe data in a network in a centralized controller to calculate latency data associated with the test probe data, wherein the test probe data is received from agents executing in host server computers and associated with transmitting test probes through the network devices in a network;

dividing the latency data into groups based upon characteristics of the network components through which the test probes traveled, wherein a first of the groups is based upon a distance that the test probes traveled in the network;

determining whether an agent is faulty by determining that the latency data derived from whether the agent exceeds a predetermined baseline by greater than a threshold amount in multiple of the groups; and ensuring that the latency data is not used when the latency data is received from the agent that is faulty.

15. The one or more computer-readable media of claim 14, further including receiving test probe timeout data and wherein the calculating of the latency data includes converting the test probe timeout data to latency data by assigning a predetermined latency value to the test probe timeout data.

16. The one or more computer-readable media of claim 15, wherein the characteristics of the network devices include one or more of the following:

a) a distance traversed by the test probes exceeding a predetermined distance;

b) a number of hops traversed by the test probes; or c) whether the network components are within a multi-tenant network or single-tenant network.

17. The one or more computer-readable media of claim 14, further including grouping the measured latency data based on whether the agent is an initiator or responder in the transmitting of the test probes.

18. The one or more computer-readable media of claim 14, further including determining the agent is faulty only if a sample size of the test probes from the agent exceeds a threshold amount.

\* \* \* \* \*